United States Patent [19]

Rilly

[11] Patent Number: 4,688,164

[45] Date of Patent: Aug. 18, 1987

[54] DIRECT-VOLTAGE CONVERTER FOR FEEDING AN APPLIANCE WITH AN INDUCTIVE COMPONENT

[75] Inventor: Gerard Rilly, Unterkirnach, Fed. Rep. of Germany

[73] Assignee: Deutsche Thomson-Brandt GmbH, Villingen-Schwenningen, Fed. Rep. of Germany

[21] Appl. No.: 836,388

[22] Filed: Mar. 5, 1986

[30] Foreign Application Priority Data

Mar. 8, 1985 [DE] Fed. Rep. of Germany ....... 3508289

[51] Int. Cl.$^4$ .................... H02P 13/18; H02M 7/5387
[52] U.S. Cl. ...................................... 363/98; 363/56; 363/132
[58] Field of Search ....................... 363/17, 56, 97–98, 363/132

[56] References Cited

U.S. PATENT DOCUMENTS

| 4,085,300 | 4/1978 | MacKenzie et al. | 363/98 X |
| 4,199,807 | 4/1980 | Crowe et al. | 363/132 |
| 4,614,998 | 9/1986 | Rilly | 363/97 X |

FOREIGN PATENT DOCUMENTS 2034541  6/1980  United Kingdom ................. 363/98

Primary Examiner—Peter S. Wong
Attorney, Agent, or Firm—Max Fogiel

[57] ABSTRACT

A direct-voltage converter for supplying an appliance with an inductive component, in which two transistors are connected in series between direct-current voltage terminals and are made alternatively conductive in a push-pull mode by the first of two windings of a transformer. Two free-running diodes are connected in parallel to the transistors, and a junction between the two diodes supplies their output voltage. This junction is connected to a further junction between the transistors, through a third winding on the transformer. An electronic switch is connected in parallel with a fourth winding of the transformer, and is periodically made conductive by the output voltage through a pulse shaper with a switching pulse. The pulse shaper has two direct current circuit points which determine the peak value and relationship of currents flowing through the two transistors. An amplitude-comparison stage in the pulse shaper has inputs connected to the two circuit points. The output voltage of the amplitude-comparison stage controls the frequency of the switching pulse. The arrangement is such that the converter protects against overload.

19 Claims, 2 Drawing Figures

DIRECT-VOLTAGE CONVERTER FOR FEEDING AN APPLIANCE WITH AN INDUCTIVE COMPONENT

Known, heretofore, is a direct-voltage converter for feeding an appliance with an inductive component, whereby two transistors are connected in series between the direct-current voltage terminals and are alternately made conductive in a push-pull mode by the first two windings of a transformer, whereby two freewheeling diodes are connected in parallel to the transistors, and whereby the junction between the two diodes, which supplies their output voltage, is connected to the junction between the transistors through a third winding on the transformer.

Both of the transistors in a circuit of this type are alternately made conductive, with the current flowing into the appliance always flowing through the third winding and accordingly inducing a current-proportional voltage in the first two windings. This voltage generates the currents necessary to control the bases of the two transistors. A driver stage is always connected to the base of each transistor in the known circuit to alternately make the transistors conductive and block them.

The direct-voltage converter in the invention disclosed in the parent application is self-excited because the transformer has a fourth winding in series with the first or second winding, because the midpoint of the series circuit is connected to the first electrode and the ends of the series circuit are connected to the second electrode of the source-to-drain section of a field-effect transistor, and because the output voltage is applied to the converter's gate electrode through a control circuit that acts as a pulse shaper. Since the field-effect transistor also constitutes a switch that periodically short-circuits the transformer, the voltages at all the transformer windings break down to zero.

Furthermore, the circuit disclosed in the parent application also involves a capacitor that is connected in parallel to each freewheeling diode and has an effect similar to that of the flyback capacitor in the horizontal final stage of a television receiver, limiting the steepness of the edges of the alternating-current voltage generated by the direct-voltage converter. These capacitors briefly take over the current flowing through the appliance, effecting an oscillatory voltage transition from zero to operating voltage at the capacitor that parallels the just-blocked transistor and a transition from operating voltage to a low negative voltage at the capacitor that parallels the previously blocked transistor. The slightly negative voltage makes the freewheeling diode that parallels the latter transistor conductive, and the diode then takes over the current that is flowing through the appliance, current which initially almost equals the breaking current of the previously switched-on transistor but subsequently slowly decreases. The diode is blocked when the decreasing current attains zero. The transistor that parallels the diode and that was previously blocked becomes conductive and takes over the current flowing through the appliance, specifically, however, in a direction opposite to that of the diode and of the previously conductive transistor.

The power supplied to the appliance is maximal when the voltage that controls the equipment approaches the resonance frequency of the inductive component of the appliance and the sum of the capacities of the two filter capacitors, the capacity of their intended parallel circuit, that is. When resonance is present, the voltage at the junction between the appliance and the filter capacitors will equal the input voltage of the direct-voltage converter, meaning the operating direct-current voltage that feeds the converter multiplied by the quality factor $Q=wL/R$ of the load. When the load is matched, when, that is, Q is no higher than 4 to 15, the voltages at the filter capacitors can be maintained at permissible levels. The frequency that is selected can only be slightly higher than the series-resonance frequency of the output circuit, the load included. This means that the current pulse-duty factor of the transistor has attained its maximal permissible level and the current through the freewheeling diodes will be relatively small and brief. When, however, the equivalent resistance R of the series resonance circuit is low in relation to the inductive reactance $ZL=wL$, the voltages through the capacitors and through the inductive component of the load will be high enough to risk damage to the components and to the active and passive semiconductor switching elements. This happens when the quality Q of the inductive load is at least approximately 15 or higher. To prevent impermissible voltages in such a threatened load, the frequency of the switching voltage applied to it must be increased considerably beyond the aforesaid series resonance frequency. This measure automatically diminishes both the peak and the pulse duty factor of the transistor currents. At a pulse duty factor of about 0.5, almost no power is supplied to the load because the phase shift between the voltage at the load and the current flowing through the load is then about ¼ period—90° or $\pi/2$. When the power at the load is minimal, the peak current will approximate, when the transistor is turned off, the current that exists when the freewheeling diode is turned on. The times during which the two components are conductive will then be about equal.

When the voltage at the load is of a specific frequency, which is determined by the switch-off frequency of the alternately conductive output transistors, the pulse duty factor of the transistor current will vary automatically with the inductive load—as an inverse function of the effective quality factor Q of the load. When, accordingly, the voltage of the load has a frequency that is only slightly higher than the series resonance frequency of the output circuit and when the quality factor Q is small, the transistor current will be shaped approximately like a sine half-wave and will be switched off at approximately the end of the half-wave. Sine the instantaneous value of the switched-off current will be relatively low in this case, the switching properties of the transistor will be incompletely exploited and losses will remain slight.

Thus, the pulse duty factor of the transistor current will be in the neighborhood of the aforesaid maximum, and both the operating conditions and efficiently of the directvoltage converter will be optimal. When, however, the equivalent resistance in the load's series circuit decreases and the quality factor Q increases as the result of an impermissible load, the energy component generated in the resistance components will decrease, whereas the remaining energy, which is stored in the inductance, will increase. This means that the transistor-current pulse duty factor will decrease automatically, with the result that the phase deviation between the edge of voltage at the load and the insertion of the transistor current will increase and the duration of the current flowing through the transistor will decrease and gradually become approximately linear. This results in a rise in the instantaneous value of the curernt at the moment the transistor is switched off, and hence a rise in both the switching losses at the transistor and in its temperature, threatening the transistor. The highest current amplitude at the instant of switching occurs in this case when the phase deviation equals ¼ of the voltage period—when the transistor-current pulse duty factor is approximately 0.5. This is true of an almost purely inductive load.

This means that, subject to load conditions with an inadequate resistance component, the amplitude of the switching current will have to be decreased, with the pulse duty factor being a function of the quality factor Q. This can be attained by for example decreasing the operating direct-current voltage through phase-trimming control of a thyristor. Another and more practical solution, in which control is possible at a lower output, consists of increasing the frequency of the voltage at the load to a constant pulse duty factor. This abbreviates the time during which the transistor is conductive, and the time becomes an inverse function of frequency. When the time is briefer, the current through the transistor becomes more or less linear with respect to time. The peak switching current of the transistor and of the parallel diode in the other transistor becomes proportional to the duration of conductivity and hence indirectly proportional to the frequency of the voltage.

When the load is matched and the quality factor accordingly low, the effective power supplied to the load can be affected by varying the frequency of the voltage at the load. The power can then be increased by decreasing the frequency in the sense of approximating it to the series resonance frequency from the inductive load component and the filter capacitors.

The object of the invention is to design the circuit that controls the direct-voltage converter in such a way as to provide effective protection against failures, especially against a too high pulse duty factor in the transistor currents and damage to the transistors.

This object is attained with the invention described in claim 1. Practical developments of the invention are described in the subsidiary claims.

Thus, the power supplied to the load is controlled in the solution in accordance with the invention by the frequency of the switching circuit—the operating frequency of the overall direct-voltage converter. Both the peak value and the pulse duty factor of the currents flowing through both of the transistors are accordingly processed in the control circuit. As long as the pulse duty factor remains below a prescribed level, 0.5 for example, the circuit does not come into operation because no threat exists. When, however, the pulse duty factor assumes a higher value, the pulse duty factor and the maximal current level are compared, related that is, by the two direct-current voltages. Depending on this comparison, then, the frequency of the switching voltage and hence of the overall direct-voltage converter is varied in the sense that the transistors counteract a pulse duty factor or a peak value that is too high. Comparison of the pulse duty factor and peak value of the current results in an advantage because the peak value of the currents flowing through the transistors can likewise increase in a desirable way along with the pulse duty factor. Varying the operating frequency will also keep the pulse duty factor and the peak value of the currents through the transistors below a maximal permissible level, even when the load impedance assumes values that are in themselves impermissible and could threaten the direct-voltage converter, especially its semiconductor components. The pulse duty factor of the currents must not exceed a certain level, 0.9 for example, to keep the freewheeling diodes conductive. Otherwise, the losses would be impermissibly high.

The purpose of what are called freewheeling diodes is, as is known, to take over the current during those times when neither of the transistors is conducting. The direct-current voltage that represents the pulse duty factor is accordingly exploited in the protective circuit in accordance with the invention as a criterion for charging the direct-voltage converter, and the charge accordingly decreased if necessary by varying the operating frequency. This is possible because, since the load has an inductive component, the impedance of the load and hence the value of the current flowing through the load depend on the operating frequency. This in turn is possible because, as the charge increases, the aforesaid pulse duty factor of the currents flowing through the transistors also increases.

An ebodiment of the invention will now be described with reference to the drawings, wherein FIG. 1 illustrates the circuitry of a direct-voltage converter in accordance with the parent application along with the control circuit in accordance with the present invention and FIG. 2 illustrates curves that explain the activity of the voltages and currents in FIG. 1.

FIG. 1 illustrates a direct-voltage converter with a converter circuit WR in accordance with the parent application. The positive pole +VS of the direct-current voltage source is connected to one terminal P1 and its negative pole −VS to another terminal P2, which is also connected to ground GR1.

Connected in parallel between terminals P1 and P2 are two series-connected npn bipole output-switching transistors T1 and T2, two series-connected switching diodes D1 and D2 with a polarity opposite that of the collector-emitter sections of transistor T1 and T2, two series-connected commutating capacitors C1 and C2, and a capacitive voltage distributor in the form of two series-connected filter capacitors C3 and C4.

The junction A between the emitter of first transistor T1 and the collector of second transistor T2 is connected through the primary winding S1 of one current transformer TR1 and through the primary winding S7 of another current transformer TR2 to the junctions B between diodes D1 and D2 and C between commutating capacitors C1 and C2.

The converter load SP, which contains the inductive component L and the resistance component R in series, is positioned between the aforesaid points B and C and a junction E between the filter capacitors C3 and C4. In practice, load SP consists of a heating coil L that has its own series resistor as well as a resistance component transmitted by the magnetic coupling. The latter is independent of the type, especially size, permeability, and coupling factor between the article to be heated (the bottom of a cooking pot or other container) and the heating coil. The latter values are generally variable. The series resistor R, which determines the quality factor Q in conjunction with the inductance of coil L, is accordingly an adjustable resistor. Inductor L is also variable in practice and depends on a number of factors like the type and size of the load and temperature and coupling. Its value is, however, assumed to be constant for the sake of simplicity.

The first current transformer TR1 generates the base-control currents for switching transistors T1 and T2, which are alternately, variably with respect to time, that is, activated, meaning that they are made conductive and blocked one after the other at contrasting intervals. The first secondary winding S2 of transformer TR1 is positioned between the emitter and base of transistor T1 and poled in such a way that, when the transistor current flows out of its emitter into the load, the current induced into secondary winding S2 will flow into the base through a source E1 of direct-current voltage. Voltage source E1 accelerated the breakdown of the charge carriers from the base-to-emitter section and hence decreases what is called its clearance time, which delays switching off the transistor. The second secondary winding S3 of transformer TR1 is similarly connected in series to another voltage source E2 between the emitter and base of second transistor T2, and poled in such a way that, when current flows from load SP into the collector of transistor T2, the induced current will flow into the base of transistor T2. The system is described in greater detail in German OS No. 2 929 312 and in the parent application. The difference in the polarities of windings S2 and S3 is indicated by the points at the ends of the windings, which show that the secondary winding S2 and S3 of transformer TR1 have opposite polarities. This means that transistors T1 and T2 are alternately activated, meaning that one is always conductive and the other blocked.

As already described in the parent application, whichever switching transistor T1 or T2 is conductive is switched off by a single active semiconductor switching element like for example an MOS field-effect output transistor T3 and two oppositely wound secondary windings of transformer TR1. Two connections for the secondary windings are connected to each other and to the source electrode S of transistor T3. The junction Y between these secondary windings S4 and S5 and the source electrode S of transistor T3 can, if the windings are galvanically separated from converter WR itself, be connected to another reference voltage. In FIG. 1 this is what is called the second ground GR2 of control circuit SK. Thus, the two ground points GR1 and GR2 illustrated are strictly galvanically separated from each other. This increases protection against high-voltage flash-over and similar events. Each of the free ends of secondary windings S4 and S5 are connected to the anode of a diode D3 or D4. The cathodes are connected to each other and to the drain electrode D of transistor T3. Transistor T3 is an output switching transistor and accordingly has a very low forward resistance when conductive and a very high resistance when blocked. Transistor T3 is activated by a positive voltage pulse UG at gate electrode G. The pulse is derived from output SA of the control circuit SK in accordance with the invention, which will be described in greater detail in what follows. A Zener diode Z1 is connected in parallel with the current path constituted by transistor T3 and limits the positive voltage at the drain-to-source section.

The two isolated secondary windings S4 and S5, which are galvanically separated from converter WR and oppositely poled, are employed to switch transistors T1 and T2 off. The voltage induced in the ungrounded terminal of winding S4 is positive when the current flows into load S0 and base current into transistor T1. During this time the voltage at winding S5 is negative. When transistor T3 is made conductive by a positive pulse at the gate-to-source section, its current path—the drain-to-source section—will constitute a low resistance. Current will then flow through winding S4 and diode D3 to second ground GR2. This creates what is practically a short circuit for all the other windings S1, S3, S3, and S5 of transformer TR1 and also interrupts the base current iB1 of the currently switched-on transistor T, and a negative base-to-emitter voltage will be supplied to the transistor from voltage source E1. The base current in the opposite direction discharges the capacitor of the voltage source, while the charge carrier in the transistor will break down and the transistor will be blocked. When current flows into the collector of transistor T2 from load SP, the voltage induced in the ungrounded terminal of winding S5 will similarly become positive and the voltage at winding S4 negative. When, therefore, transistor T3 is made conductive, it constitutes a short circuit with respect to winding S5 over diode D4 and hence causes transistor T2 to become blocked in the way described in the foregoing with respect to transistor T1. Winding S5 can also be left out and the anode of diode D4 directly connected to the junction between winding S3 and voltage source E2. In that case of course the ground terminals of converter WR and control circuit SK would be common and circuits WR and SK would not be galvanically separated.

The function of converter WR will now be described with reference to FIGS. 2A to F. When a starting pulse from an unillustrated generator arrives at the base of transistor T2, the transistor become conductive and connects point A to ground GR1. A voltage VEA becomes active at load SP. This voltage equals ½ of the applied operating voltage VS at junction E when the operating voltage is applied to converter WR. Switching transistor T2 on generates a current through the inductance L of load SP, through the primary windings S7 and S1 of transformers TR2 and TR1, and through the collector-to-emitter section of transistor T2 to ground GR1. The current simultaneously discharges filter capacitor C$ and charges filter capacitor C3. The process is one of oscillation to a resonance frequency approximately in the shape of a sine half-wave with a frequency dictated by the inductance of load SP and the sum of the capacitances of both filter condensors C3 and C4. The collector current of transistor T2 flows through the primary winding S1 of transformer TR1. Its secondary winding S3 generates a base-control current iB2. The base current has the same shape as and is approximately proportional to the current flowing through the load. Since this is a case of positive or regenerative feedback, transistor T2 remains saturated. Since the two transistors T1 and T2 must be prevented from conducting simultaneously when the sinusoidal current through load SP has attained its first zero pass, transistor T2 must be switched off. This is attained with a direct or indirect short circuit in the base-controlling winding S3 and by applying a blocking voltage to the base-to-emitter section to abbreviated clearance time before the current's zero pass emerges through the load.

Figure 1:
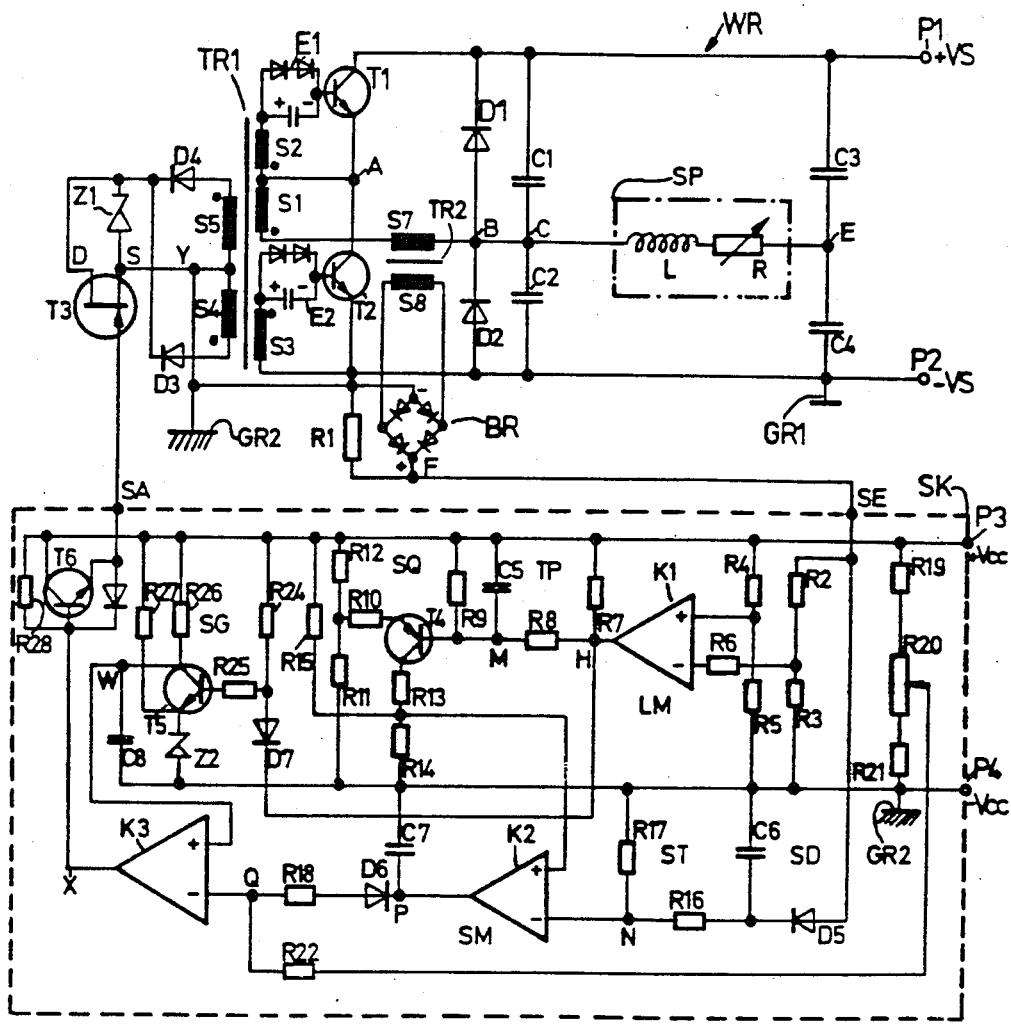

In FIGS. 2B, 2C, 2E, and 2F, the current flowing from the load has a negative sign and the current flowing into the load a positive sign.

When a positively oriented pulse UG is applied to the gate electrode G of transistor T3 at time t1 as illustrated in FIG. 2A, the base current iB2 of the transistor T2 that is conductive at that time is switched off. The collector current iC2 of transistor T2 is, as illustrated in FIG. 2B, switched off at a time t2 at the end of a period $ts=t2-t1$. This period is what is called the charging time, and is necessary for the breakdown of the charge carriers in the collector-to-emitter section of the transistor in order to block the transistor. At time t2 the current flowing out of load SP has an instantaneous value Isw and is taken up by commutating capacitors C1 and C2. Capacitor C2, which carries an initial voltage VS, is rapidly discharged by a resonance oscillation, specifically through inductance L, so that capacitor C1 assumes a slightly negative voltage at time t3. This is necessary in order to make the free-wheeling diode D1 that parallels capacitor C1 conductive. During the same period of time from t2 to t3, commutating capacitor C2, which is initially uncharge, is charged by a resonance process to a voltage that approximates operating voltage VS. The capacitances of commutating capacitors C1 and C2 are kept small enough to keep the transition time $t3-t2$ brief. The value is on the other hand high enough to maintain the steepness of voltage increase dv/dt at transistor T2, which has just been blocked, below a maximal permissible level. The voltage transition at commutating capacitor C2 during time t2-t3 is illustrated in FIG. 2D. Diode D2 was made conductive at time t3. It takes up the current from the load at an initial amplitude that is somewhat less than transistor-switching current Isw. Beginning at time t3 the value of current iD1 flowing through the diode changes and attains zero at time t4 as illustrated in FIG. 2C. The voltage UG at the gate electrode of transistor T3 has become zero between t3 and t4. Transistor T1, which is parallel to the now non-conductive diode D1, is switched on at time t4 as illustrated in FIG. 2E. The collector current iC1 of transistor T1 flows into load SP through the primary winding S1 of transformer TR1. Thus, the positive feedback of secondary winding S2 generates the base-control current for transistor T1.

The frequency of the pulse UG illustrated in FIG. 2A with respect to controlling transistor T3 is only slightly higher than twice the series resonance frequency of the inductance L of load SP and of the sum of the capacitances of filter capacitors C3 and C4. Thus, the collector current iC1 of transistors T1 passes through a maximum and subsequently decreases before the next pulse UG arrives at the gate electrode G of transistor T3 at time t5. Upon expiration of clearance time ts transistor T1 becomes blocked at time t6 when the current through load SP equals Isw.

The current flowing into load SP is now taken over again by commutating capacitors C1 and C2, whereby capacitor C1 is recharged by an oscillation due to resonance from zero to operating voltage VS, and capacitor C2 is discharged, also by an oscillation due to resonance, from operating voltage VS to a slightly negative value. This value is attained at time t7 and makes free-wheeling diode D2 conductive. The current iD2 illustrated in FIG. 2F attains its maximal amplitude at time t7 and then decreases slowly until it attains zero at time t8. Transistor T2 was blocked before time t8. Transistor T2, to which diode D2 is parallel and which has just been blocked, can now carry a collector current iC2 in the opposite direction, a current accordingly that is arriving as illustrated in FIG. 2B from load SP and is hence flowing out of load SP and toward the let in FIG. 1.

The polarity of the voltage at load SP is accordingly reversed. The shape of the curve of the collector current iC2 of transistor T2 at time t8-t10 is identical to that of the current iC1 in transistor T1 in FIG. 2E during time t4-t6. Transistor T is again switched off by the next control pulse UG at time t9 as illustrated in FIG. 2A. The switching off itself occurs at time t10 subsequent to the expiration of clearance time $ts=t10-t9$. The foregoing process then repeats as described.

There is a pulse UG at the output SA of control circuit SK that is connected to the gate of transistor T3. Control circuit SK will be described in greater detail in what follows. The voltages that occur in control circuit SK are illustrated in FIGS. 2G-J.

The secondary winding S8 of current transformer TR2 supplies output voltages with both polarities that are proportional to the currents flowing one after another through transistors T1 and T2. In order to derive from these voltages voltages that have only one, specifically the positive, polarity, the terminals of secondary winding S8 are connected to the input terminals of a bridge rectifier BR. Secondary winding S8 is galvanically separated from converter W. Thus, the negative output terminal of bridge rectifier BR can be connected to second ground GR2, whereas positive output terminal F is connected to the input SE of control circuit SK. A resistor R1 is also connected parallel to the output terminals of bridge rectifier BR. The output terminal F of bridge rectifier BR supplies a voltage UF, illustrated in FIG. 2G, which has the same shape as the collector currents iC1 and iC2 in transistors T1 and T2.

Voltage UF, which is proportional to the currents flowing through transistors T1 and T2, is supplied to the input of an amplifier LM, which limits and inverts the amplitude, which is similar in operation to a zero-pass detector, and which contains operational amplifier K1 for high-gain analog voltage comparison. Voltage UF is also supplied to a point-contact rectifier SD that contains a rectifier diode D5 and a charge or filter capacitor C6 connected in parallel to a voltage distributor ST. The voltage distributor consists of the series-connected resistors R16 and R17.

The non-inverting input of the amplifier K1 that functions as a voltage distributor is connected to the junction of another voltage distributor with resistors R4 and R5 and obtains from it a low direct-current reference voltage. The inverting input of amplifier K1 is connected to the junction of two resistors R2 and R3, both ends of which are connected to input terminal SE and second ground GR2.

The output H of amplifier K1 is connected to positive operating-voltage terminal P3 through a pull-up resistor and supplies a square voltage UH as illustrated in FIG. 2H. Voltage UH always contains positive pulses separated by zero-voltage sections while transistors T1 and T2 are blocked, the times during which one of the transistors T1 and T2 is conductive. The output H of amplifier K1 is connected to a low-pass filter TP positioned between output H and positive operating-voltage terminal P3. The output M of low-pass filter TP, which is the junction of resistor R8 and capacitor C5, will thus supply a direct-current voltage with an amplitude that is inversely proportional to the switching-on times (t4–t6 or t8–t10) of transistors T1 and T2 and hence also inversely proportional to the pulse duty factor of the transistor currents, which can vary between 0.5 and 0.8 or 0.9. A pulse duty factor is defined herein as the ratio of the time during which current is flowing through a transistor—t4–t6, t8–t10, or t12–t14—to the duration of a positive half-wave in the voltage UC illustrated in FIG. 2D—the time t2–t6. Thus, for a pulse duty factor of 0.5, the aforesaid direct-current voltage UM will approximate half of the operational voltage +Vcc/2, specifically about +6 V. When the pulse duty factor increases, voltage UM decreases because the duration of the pulses UH in FIG. 2H will decrease.

The output voltage UM from low-pass filter TP is supplied to the base of a transistor T4 of the pnp type that functions as a controlled source SQ of current with a threshold consisting of a voltage distributor R12 and R11 located between positive operating-voltage terminal P3 and negative operating-voltage terminal P4 with its junction connected to the emitter of transistor T4 through an emitter resistor R10. The base of transistor T4 is also connected to positive operating-voltage terminal P3 through a base resistor R9. The collector of transistor R4 is connected to negative operating-voltage terminal P4 through two series-connected resistors R13 and R14. The junction between resistors R13 and R 14 is connected on the one hand to positive operating-voltage terminal P3 through another resistor R15 and on the other to the non-inverting input of an operational amplifier K2, which also functions as a high-gain comparison stage. The junction N between resistors R16 and R 17, which constitutes the output of a point-contact rectifier SD, is connected to the inverting input of amplifier K2.

The threshold constituted by voltage distributors R11 and R12 at voltage source SQ with pnp transistor T4 keeps transistor T4 blocked as long as the pulse duty factor of the currents flowing through transistors T1 and T2 does not exceed 0.6. The minimal pulse duty factor is approximately 0.5 and occurs specifically when practically no power is being transmitted. When transistor T4 is blocked, the voltage supplied to the non-inverting input of amplifier K2 is determined by voltage distributors R15 and R14. This voltage dictates the peak value of the currents that transistors T1 and T2 can conduct as long as the pulse duty factor is low, meaning that it does not exceed 0.6 for instance. When the pulse duty factor—the period during which transistors T1 and T2 are conductive—increases beyond a prescribed threshold, the base voltage of transistor T4 is decreased until the transistor generates a collector current through resistors R13 and R14. The additional decrease in voltage through resistor R14 that results from this collector current causes an increase in the voltage supplied to the non-inverting input of amplifier K2, so that the permissible maximum for the currents flowing through switching transistors T1 and T2 can increase. The purpose of this procedure will now be described.

At a pulse duty factor of 0.5 the switching current will equal the maximum for the current flowing through load SP. When, however, the time during which the transistors are conductive, and hence the pulse duty factor, increases, the switching current Isw that switches transistors T1 and T2 off will become weaker. As the pulse duty factor increases, therefore, the collector current supplied by transistor T4 will become more powerful, and hence the voltage supplied to the non-inverting input of amplifier K2 as well.

The peak value of the currents that can flow through transistors T1 and T2 is accordingly increased above a certain threshold depending on the increase in the pulse duty factor of the currents. At a higher pulse duty factor, therefore, a higher peak value for the currents flowing through transistors T1 and T2 will intentionally be allowed.

When the voltage being supplied from output N of point-contact rectifier SD to the inverting input of the second amplifier K2 equals that being supplied to the non-inverting input and varying in accordance with the pulse duty factor, the output P of amplifier will return to zero from a high level (+Vcc). Output P is connected on the one hand to ground GR 2 through a capacitor C7 that delays the transition of the voltage from a lower to a higher value and on the other, through a diode D6 and a resistor R18, to the inverting input Q of an operational amplifier K3 with voltage comparison and high gain, the function of which will be explained later herein. Inverting input Q is also connected through a resistor R22 with the slide contact of a potentiometer R20 that is positioned in series with a resistor R19 and R21 at each end between positive and negative operating-voltage terminals P3 and P4. In normal operation, potentiometer R20 supplies a voltage for manually adjusting the frequency of pulses UG and hence the frequency of the voltage at load SP. The potentiometer can accordingly be employed to adjust the power supplied to the load as will be explained later herein.

The output H of amplifier K1 is also connected to the cathode of a diode D7, the anode of which is connected to positive operating-voltage terminal P3 through a resistor R24 and to the base of a pnp transistor T5 through a resistor R25.

The collector of transistor T5 is connected to positive operating-voltage terminal P3 through a resistor R26 and to negative operating-voltage terminal P4—ground GR2—through a capacitor C8. The emitter of transistor T5 is connected to the junction between a Zener diode Z2 and a resistor R27 that is connected to positive operating-voltage terminal P3. The anode of diode Z2 is connected to negative operating-voltage terminal P4. Diode Z2 is conductive only when transistor T5 is blocked and applies the transistor emitter to a Zener voltage VZ2 of approximately 2.7 V. Transistor T5 constitutes in conjunction with collector resistor R26 and capacitor C8 a time-to-voltage converter or sawtooth generator SG that is controlled by the output voltage from amplifier K1 as illustrated in FIG. 2H.

FIG. 2J illustrates the voltage UW at the output W of sawtooth generator SG. This output is the collector of transistor T5 and is connected to the non-inverting input of an amplifier K3, which functions as a comparator. When the voltage in FIG. 2H attains its lower level of zero—during the period that transistors T1 and T2 are conductive—the diode D7 between the output of amplifier K1 and the junction of resistors R24 and R25 becomes conductive and accordingly keeps the base voltage of transistor T5 below the emitter voltage. This blocks transistor T5 as long as one of transistors T1 and T2 is conductive. Capacitor C8 is charged through a resistor R26. This results in an approximately linearly increasing voltage at output W during the periods t4-t6, t8-t10, and t12-t14. When, at times t2, t6, t10, and t14, the output voltage UH from amplifier K 1 assumes the higher value, diode D7 becomes blocked. Transistor T5 becomes conductive and discharges capacitor C8 to a voltage in the vicinity of the Zener voltage VZ2 of diode Z2. Transistor T remains conductive as long as voltage UH remains at its high level—operating voltage Vcc. When, at times t4, t8, t12, and t6, the flow of current through one of the transistors T1 and T2 restores the output H of amplifier K1 to its lower level—approximately zero—transistor T5 becomes blocked and capacitor C8 is recharged, resulting in a renewed sawtooth voltage UW, which is supplied to the non-inverting input of amplifier K3.

As long as the output P of the amplifier K2 that limits the peak value of the current does not go to the lower voltage level (low), this means that the switching current in converter WR, which is also flowing through winding S7, does not exceed the maximal permissible value. The inverting input Q of amplifier K3 will then accept only voltage from potentiometer R20 that is employed to adjust the frequency. Thus, the output X of amplifier K3 will remain at the lower voltage level (low) as long as sawtooth voltage UW does not equal the voltage employed to control frequency. When this situation occurs, as at times t1, t5, t9 and t13 in FIG. 2J, output X will go to high and will constitute the ascending edge of a voltage pulse that will be supplied to the base of transistor T6. Transistor T6 is a dipole npn type in collector circuitry. Its collector is directly connected to positive operating-voltage terminal P3. The junction between its base and the output X of third amplifier K3 is connected to terminal P3 through what is called a pull-up and base resistor R28. The emitter of transistor T6, which constitutes a buffer stage in the form of an emitter follower, is connected to the gate G of transistor T3 through the output terminal SA of control circuit SK. Output X remains high as long as sawtooth voltage UW is higher than the voltage at the input Q of amplifier K3 that is employed to adjust the frequency. This means that the pulse at the output of third amplifier K3 has a descending edge that commences at the instant transistor T5 is switched on. Ignoring the effects of stray capacities and inductances, the hysteresis of current transformer TR, and the clearance times of all the bipole transistors in first amplifier that have been operated simultaneously in saturation, transistor T5 is switched on at almost the same time that one of transistors T1 and T2 is switched off. This means that the pulse UG in FIG. 2A, the shape of which is almost identical to that of the output pulse of amplifier K3, would be too short to bias the bases of transistors T1 and T2 during the resonance-like transitions (t3−t2 or t7−t6) to commutating capacitors C1 and C2 in the blocking direction (in conjunction with sources E1 and E2 of voltage). This is necessary to avoid switching off one of transistors T1 and T2 prematurely before freewheeling diodes D1 and D2, which are associated with the previously blocked transistor, become biased in the pass direction in order to take over current stored in the inductive component L of load SP. In practice the overall effects of hysteresis properties, of the stray inductances and capacities of the second current transformer, and of the clearance times of all the transistors that are simultaneously connected into the integrated circuits K1 and K3, which function as analog voltage comparators, are more than sufficient to extend the duration of gate-control pulses UG beyond the times t3, t7, t11, and t15 in FIGS. 2C and 2F during which freewheeling diodes D1 and D2 are switched on. This can be done for example by using a National Semiconductor LM 339 quad comparator ICs. The capacitances of commutating capacitors C1 and C2 that have been selected are low enough to keep the voltage transistions at about 1-2 $\mu$sec. If, however, the aforesaid delay properties (which can be observed on an oscilloscope) are inadequate, small, grounded, parallel capacitances can be introduced into the signal path between the output F of bridge rectifier BR and the input of sawtooth generator SG or at the output of amplifier K3.

FIG. 2K illustrates the effect of decreasing the pulse duty factor with an incorrectly matched load—by increasing the quality factor Q of the inductive load as specifically illustrated at peak current to explain the function of the stage SM that limits the peak current.

Figure 2:
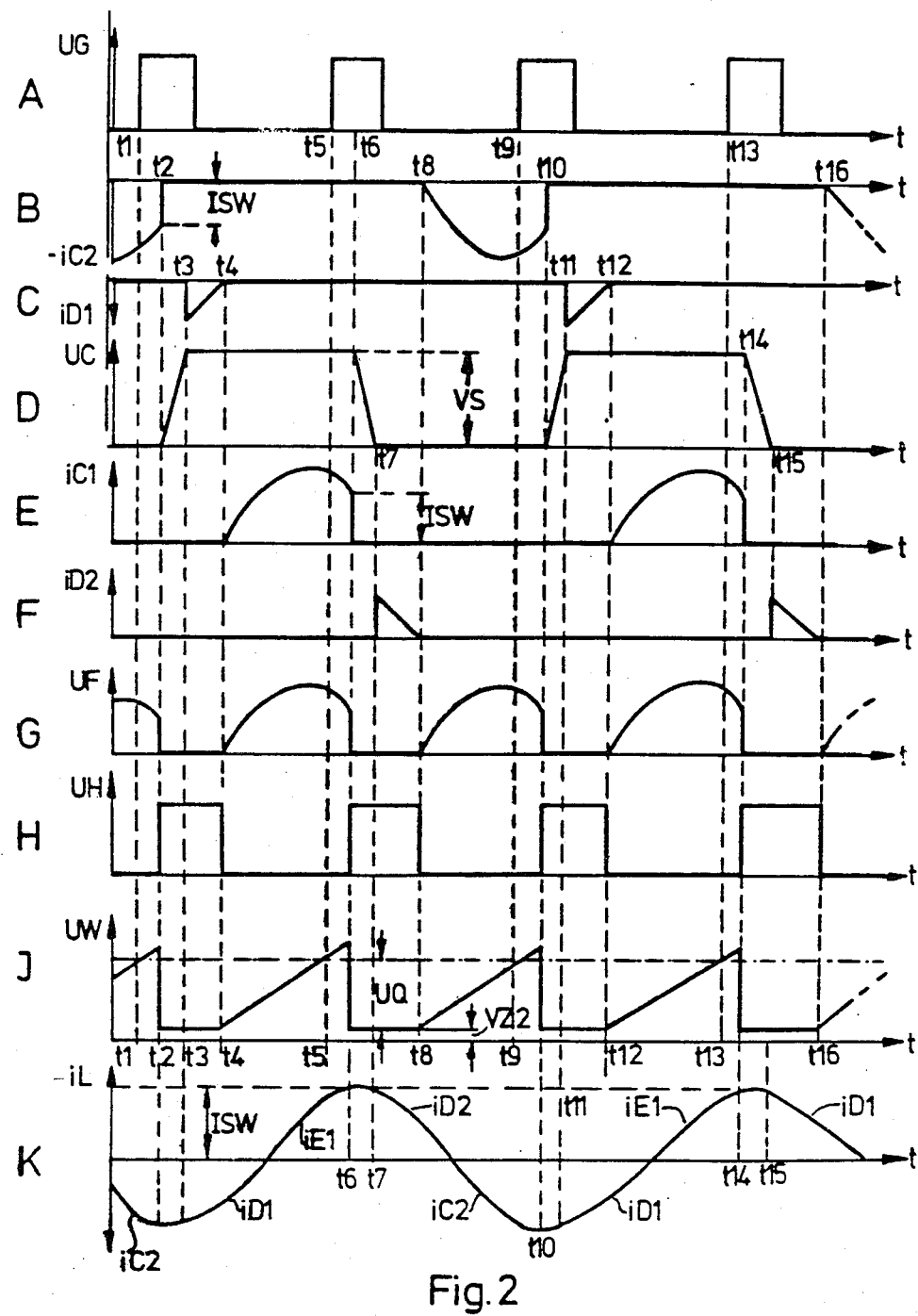
FIG. 2A shows the voltage UG at the gate electrode of transistor T3 that switches off transistor T1 or T2.
FIG. 2B shows the collector current iC2 of transistor T2.
FIG. 2C shows the current iD1 of first freewheeling diode D1.
FIG. 2D shows the voltage UC at the junction of load SP with commutating capacitors C1 and C2, freewheeling diodes D1 and D2, and the primary winding S7 of current transformer TR2.
FIG. 2E shows the collector current iC1 of transistor T1.
FIG. 2F shows the current iD2 flowing through freewheeling diode D2.

When quality factor $Q=wL/R$ increases—when the load becomes more inductive—the phase shift (t4−t3, t9−t8, t12−t11, and t16−t15 in FIG. 2) between switching the votlage over to the load and switching on the currents with transistors T1 and T2 will increase, and its pulse duty factor will decrease at a given frequency of control pulses UG. This is illustrated in FIG. 2K, which shows the current iL flowing through load SP. When the absolute value $Z=r+wL$ of load impedance remains constant, the level of the peak current will also initially remain constant, although shifted in phase to the extent that the switching current that the transistor has to switch off becomes more powerful, as does the peak current through the freewheeling diode. In that case, current-limiting amplifier K2 begins to make the output X of third amplifier K3 positive at the instant the voltage supplied from the output N of point-contact rectifier SD becomes equal to or higher than the voltage supplied from the non-inverting input of amplifier K2. If both voltages are equal, the output P of second amplifier K2 goes to low (zero). Diode D6 becomes conductive and produces current over both resistors R22 and R18. In that case, the voltage UQ at the inverting input of amplifier K3 drops to a lower value than would in itself be obtained just from the potentiometer that is employed to adjust the frequency. When this occurs, the voltage that is applied to the non-inverting input of amplifier K2 and represents the pulse duty factor attains its lowest level, the level prescribed only by voltage distributors R15 and R14. In that case, specifically, the voltage source with transistor T4 is switched off.

If sawtooth voltage UW is already higher than the resulting regulating voltage UQ, output X immediately becomes high and accordingly generates the ascending edge of gate pulse which begins to block transistor T1 or T2. If sawtooth voltage UW has still not attained the level UQ, which is UD, only true when the frequency-control voltage is not very high, the ascending edge of the duty pulse will occur as soon as that condition is fulfilled. This abbreviates the duration of conductiveness of transistor T1 or T2 as well as that of the freewheeling diodes. The latter can never be longer than that of the transistors. The result is to increase the frequency of the pulses UG in FIG. 2A. Abbreviating the conductiveness period of the transistor lowers the peak value of the current flowing through load SP and hence diminishes the amplitude of switching current Isw. When, accordingly the load impedance becomes to small for a specific switching frequency, the inductive reactance wL of the load is increased by increasing the frequency. This again means diminishing the amplitude of the current flowing through the load. The current flowing through load SP is accordingly controlled by controlling the frequency of pulse UG and hence the operating frequency of converter WR.

If the converter is employed for induction heating and the load is a flat spiral coil, incorrect matching of the load can result from the absence of a cooking pot on the coil, from the presence of a pot with a bottom diameter less than the diameter of the coil, from positioning a pot on the coil off center, or from using a pot with a bottom that does not contain a plate of ferromagnetic material but consists for example of pure aluminum, copper, or austenitic manganese steel, which are inappropriate for induction heating.

As FIG. 1 shows, the actual converter WR and control circuit SK are strictly galvanically separated by transistors T1 and T2, with a separate ground connection GR1 and GR2 on each side of the separating line constituted by the transistors. The ground connections can accordingly be positioned at different and independent potentials, one directly at the mains ground and one at the other direct-current voltage. The advantage of this design is that a galvanic separation from the mains can be achieved.

I claim:

1. A direct-voltage converter for feeding an appliance with an inductive element, comprising: a source of direct voltage: a transformer having a first two windings connected to two transistors for making said two transistors alternately conductive in a push-pull mode; two free-running diodes connected in parallel with said two transistors; a third winding on said transformer, said two diodes being connected to each other at a junction between said free-running diodes which is connected to a junction between said two transistors through said third winding, said junction between said diodes supplying output voltage of said diodes; a fourth winding on said transformer, and electronic switching means connected in parallel with said fourth winding; pulse shaping means for making said electronic switching means periodically conductive with a switching pulse; said pulse shaping means having two direct current circuit points with voltages proportional to the peak value and periodicial relationship of currents flowing through said two transistors; an amplitude-comparison stage in said pulse shaping means with inputs connected to said two circuit points for comparing the voltages at said two circuit points, said amplitude-comparison stage having an output voltage controlling frequency of said switching pulse for protecting said converter against circuit failure.

2. A converter as defined in claim 1, wherein said two transistors have a common current path; an auxiliary transformer having a primary winding connected in said common current path of said two transistors, said auxiliary transformer having a secondary winding providing direct-current voltages at said two direct current circuit points.

3. A converter as defined in claim 2, including a bridge rectifier with inputs connected to said secondary winding and having an output voltage for generating said direct current voltages at said two circuit points.

4. A converter as defined in claim 3, including a point-contact bridge rectifier, said output voltage of said rectifier being proportional to said currents flowing through said two transistors and being supplied to said point-contact rectifier, said point-contact rectifier having an output voltage used as an initial direct-current voltage at one of said two circuit points.

5. A converter as defined in claim 4, including a low-pass filter and an amplitude limiter, said output voltage from said bridge rectifier being applied to said low-pass filter through said amplitude limiter for generating a square-wave voltage, said filter having an output voltage used as another direct-current voltage at the other one of said two circuit points.

6. A converter as defined in claim 5, including a threshold circuit connected downstream of said low-pass filter and activated only above a predetermined relationship of said currents flowing through said two transistors.

7. A converter as defined in claim 5, including a sawtooth generator with a triggering input connected to an output of said amplitude limiter.

8. A converter as defined in claim 5, wherein said amplitude-comparison stage comprises a high-gain operational amplifier.

9. A converter as defined in claim 5, wherein said amplitude limiter comprises a high-gain operational amplifier.

10. A converter as defined in claim 1, including a second amplitude-comparison stage having inputs connected to an output voltage from said first-mentioned amplitude-comparison stage and a further voltage varying substantially linearly during predetermined time intervals in which current flows through said two transistors, said second amplitude-comparison stage having an output voltage used as said switching pulse for said electronic switching means.

11. A converter as defined in claim 10, including a source of variable direct-current voltage for adjusting the operating frequency of the converter and being applied to an input of said second amplitude-comparison stage.

12. A converter as defined in claim 10, including a diode connected between the output of said first amplitude-comparison stage and the input of said second amplitude-comparison stage.

13. A converter as defined in claim 1, wherein said electronic switching means comprises a field-effect transistor.

14. A converter as defined in claim 13, wherein said fourth winding is a galvanic winding separated from the other windings.

15. A converter as defined in claim 14, wherein said fourth wining comprises two partial windings connected in series at a junction which is connected to a first electrode of a source-to-drain section of said field-effect transistor, ends of said two partial windings connected in series being connected through two diodes to a second electrode of said source-to-drain section of said field-effect transistor.

16. A converter as defined in claim 15, including a Zener diode between said junction of said free-running diodes and an electrode of said field-effect transistor.

17. A converter as defined in claim 15, wherein said two partial windings have opposite polarities.

18. A converter as defined in claim 15, wherein said two transistors have a common current path; an auxiliary transformer having a primary winding connected in said common current path of said two transistors, said auxiliary transformer having a secondary winding providing direct-current voltages at said two direct current circuit points; a bridge rectifier with inputs connected to said secondary winding and having an output voltage for generating said direct current voltages at said two circuit points; said junction of said partial windings being connected to an output terminal of said bridge rectifier and to a ground connection of said pulse shaping means.

19. A converter as defined in claim 1, wherein said pulse shaping means is galvanically separated from said converter with said two transistors, said pulse shaping means and said converter with said two transistors having separate ground connections.

* * * * *